A. B. DISS.
CASTER FOR TUBULAR LEGS FOR FURNITURE.
APPLICATION FILED APR. 30, 1908.

911,214. Patented Feb. 2, 1909.

Witnesses
E. La Gay
C. M. Riemann

Albert B. Diss   Inventor
By his Attorneys Burney & Ogden

UNITED STATES PATENT OFFICE.

ALBERT B. DISS, OF NEWARK, NEW JERSEY, ASSIGNOR TO UNIVERSAL CASTER & FOUNDRY COMPANY, A CORPORATION OF NEW JERSEY.

CASTER FOR TUBULAR LEGS FOR FURNITURE.

No. 911,214.

Specification of Letters Patent.

Patented Feb. 2, 1909.

Application filed April 30, 1908. Serial No. 430,136.

*To all whom it may concern:*

Be it known that I, ALBERT B. DISS, a citizen of the United States, residing at Newark, New Jersey, have invented certain new and useful Improvements in Casters for Tubular Legs for Furniture, of which the following is a specification, (Case 4,) accompanied by drawings.

The invention relates to the class of casters having pintles and means for supporting and holding the pintle within a relatively large tubular leg which the caster is to support. It is customary to secure around the foot of tubular legs or to cast thereupon an annular ornamentation or ornamental collar which is termed a leg mount.

The object of the present invention is to combine the leg mount in an improved caster construction in such a way as not only to obviate the need of separately securing the leg mount to the leg, but also in the preferred form to utilize the leg mount as a means of centering the pintle and leg. This the present invention accomplishes by securing the leg mount to a detachable socket which fits within and is retained by the tubular leg and which receives and detachably holds the caster pintle and preferably both centers the pintle at the foot of the leg and also supports the weight of the leg and transmits it to the lower end of the pintle.

In my co-pending application No. 430,135 I have described a caster having a leg mount secured to its pintle and a socket detachably holding the pintle and adapted to fit and be held within the interior of the tubular leg, and I have claimed the same generically and the present invention is not intended to cover or dominate anything therein claimed.

Figure 1:
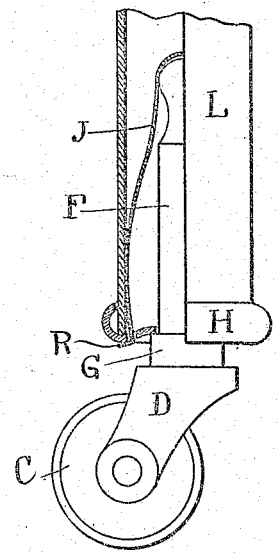
Figure 2:
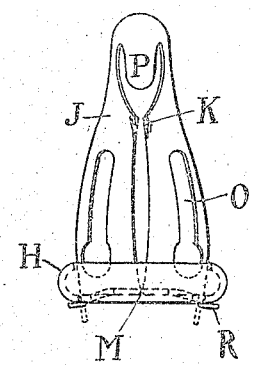
Figure 3:
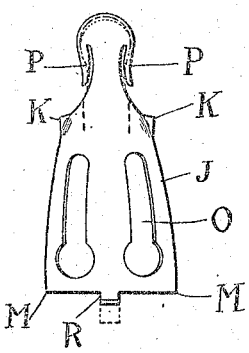
Figure 4:
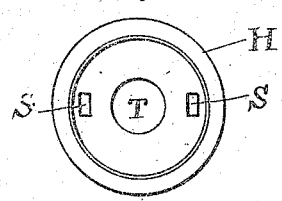
Figure 5:
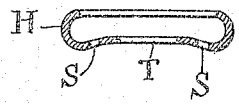
Figure 6:
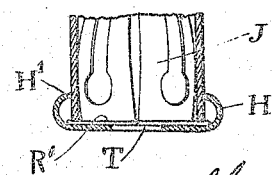

In the drawings, Figure 1 is a side elevation partly in central section of a caster structure embodying the present invention. Fig. 2 is a side elevation of the combined spring socket and leg mount of Fig. 1. Fig. 3 is a view of the same at right angles, omitting the leg mount. Fig. 4 is a plan view of the leg mount only. Fig. 5 is a cross section of the same. Fig. 6 shows a modified detail of construction.

In this preferred construction the caster wheel C, jaws D and pintle F with its shoulder or collar G of any suitable form, are detachably held to the socket member and the socket member combines the leg mount H and the socket proper J. The socket member J fits tightly within the tubular leg L, being jammed therein and sufficiently resilient to be held in place by friction against the inner wall of the leg. It may be of the bulged or barrel-like form made of sheet steel pressed to the shape shown, the two lateral halves having a supporting bearing against each other, as at the shoulders K and at the lower ends as at M. The slits or openings O add to the resilience of the socket but these features and the general shape of the socket are old. The head of the pintle F has a bearing laterally at the upper end of the socket and is held to the socket by the spring leaves P which slip over the rounded head of the pintle and engage the neck of the pintle, as shown by the dotted lines in Fig. 3. At the lower end the socket is united, preferably as shown, to the leg mount. This may be accomplished by providing tongues R which project through openings S in the leg mount and are turned over, as plainly seen in Figs. 2 and 3, so as to prevent their being withdrawn from the openings S. Preferably the openings S fit the tongues loosely so as to allow some play for the lower end of the spring socket; but this is not essential as the slightly bulging sides of the spring socket may afford all the necessary spring for accommodating the slight variations in the interiors of the tubes which the socket is designed to fit.

The leg mount H at its turned-up or collar portion surrounds and approximately fits the leg L when in place, while the disk portion surrounds and fits the pintle by means of the central opening T (Fig. 4). Preferably the side thrusts produced when the caster is subjected to weight upon the leg are supported at the foot of the leg solely by means of the leg mount H, the disk of which transmits the thrusts between the pintle and the outer surface of the leg and centers the lower end of the pintle while the upper end of the pintle is sufficiently centered by means of the socket J.

In operation the socket may be first thrust into the leg for which it is fitted until the leg mount H receives and surrounds the extreme end of the leg; then the pintle may be thrust through the hole T and up into the socket until its head is received and held by the springs P so that it will not fall out. Preferably the pintle will not have an end-thrust-bearing at the upper end of the socket and the entire weight of the leg is supported on the leg mount member which forms the leg-supporting disk, the leg mount thus performing the triple function of centering the pintle and leg, supporting the weight and transmitting it to the shoulder or collar G of the pintle, and securing the lower ends of the socket so they cannot pass too far up into the leg. The socket when in use detachably holds the pintle in place and centers its upper end within the leg and by means of friction against the inner wall of the leg and by its attachment to the leg mount it holds both itself and the leg mount in position in respect to the leg.

It will be seen that in the preferred form described the socket is a hollow or openwork frame of spring material capable of being jammed within the tubular leg and affording the necessary retaining friction and of retaining and centering the head of the pintle without being broken or deformed by the weights which the leg is called upon to bear.

Fig. 6 shows another way of securing the leg mount H to the socket or frame J, consisting in this instance of outturned flanges R' on the lower ends of the socket or frame which are of such width that the inturned edge H' of the leg mount, which I have shown in cross section, will not allow them to be withdrawn. This constitutes a very loose way of securing the leg mount to the frame. As it cannot be specifically claimed as a modification in this application, it forms the subject matter of a specifically separate invention and application, but I herein claim it generically with the other means shown.

I make no claim to the particular form of spring socket or frame, as the general form illustrated is indeed already well known and obviously many other suitable forms may be substituted.

In defining the invention in the following claims I do not mean to make any distinction as between sockets and frames, both being well-known in many forms.

I claim and desire to secure the following:

1. A caster having a combined leg mount and disk for centering and supporting the foot of a tubular leg, a spring socket or frame secured to such combined mount and disk, and a pintle which is centered in the said combined mount and disk and in the said socket or frame and secured thereto.

2. A caster having a combined retaining socket or frame and leg mount provided with means for detachably securing them to a tubular leg and to the caster pintle.

3. A caster having a combined socket or frame and leg mount adapted to be frictionally held to a tubular leg, said leg mount surrounding and centering the leg, and the pintle detachably secured to the socket or frame and received in and centered by the leg mount.

4. A caster having a retaining socket or frame, leg mount and pintle, the socket or frame being secured to the leg mount and detachably securing the pintle, and adapted to fit and be frictionally retained within a tubular leg, the leg mount being adapted to surround and center the foot of the leg, and the pintle being centered by the socket or frame and the leg mount.

5. A caster having a retaining socket or frame adapted to fit the tubular leg, a pintle held therein and a leg mount for surrounding the foot of the leg directly secured to the said socket or frame.

6. A caster having a retaining socket or frame adapted to fit the tubular leg, a pintle held therein and a leg mount for surrounding the foot of the leg directly secured to the said socket or frame by means of perforations in the said leg mount and coöperating projections on the said socket or frame.

In testimony whereof I have signed this specification in the presence of two subscribing witnesses, April 29, 1908.

ALBERT B. DISS.

Witnesses:
HAROLD BINNEY,
E. VAN ZANDT.